United States Patent
Griffiths et al.

(10) Patent No.: US 9,874,108 B2
(45) Date of Patent: Jan. 23, 2018

(54) CLEANING SYSTEM FOR A TURBOFAN GAS TURBINE ENGINE

(71) Applicant: Rolls-Royce Corporation, Indianapolis, IN (US)

(72) Inventors: George F. Griffiths, Southlake, TX (US); Prahlad R. D. Heggere, Carmel, IN (US); Jeffrey A. Green, Brownsburg, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 313 days.

(21) Appl. No.: 14/749,269

(22) Filed: Jun. 24, 2015

(65) Prior Publication Data

US 2016/0010497 A1 Jan. 14, 2016

Related U.S. Application Data

(60) Provisional application No. 62/021,939, filed on Jul. 8, 2014.

(51) Int. Cl.
| | |
|---|---|
| *F01D 9/06* | (2006.01) |
| *F01D 25/00* | (2006.01) |
| *B08B 9/00* | (2006.01) |
| *F04D 29/70* | (2006.01) |

(52) U.S. Cl.
CPC ........... *F01D 25/002* (2013.01); *B08B 9/00* (2013.01); *F01D 9/065* (2013.01); *F04D 29/705* (2013.01); *F05D 2230/72* (2013.01); *F05D 2260/607* (2013.01); *F05D 2300/612* (2013.01); *Y02T 50/675* (2013.01)

(58) Field of Classification Search
None
See application file for complete search history.

(56) References Cited

U.S. PATENT DOCUMENTS

| | | | |
|---|---|---|---|
| 3,623,668 A | 11/1971 | Field et al. | |
| 3,778,170 A | 12/1973 | Howell et al. | |
| 4,046,155 A * | 9/1977 | Mansson | B08B 3/02 |
| | | | 134/167 R |
| 4,834,912 A | 5/1989 | Hodgens, II et al. | |
| 5,679,174 A | 10/1997 | Buongiorno | |
| 5,944,483 A * | 8/1999 | Beck | F01D 25/002 |
| | | | 134/104.1 |
| 6,478,033 B1 | 11/2002 | Foster | |

(Continued)

FOREIGN PATENT DOCUMENTS

| | | |
|---|---|---|
| DE | 102008047493 A1 | 4/2010 |
| GB | 2207210 A | 1/1989 |
| WO | 2015051146 A1 | 4/2015 |

OTHER PUBLICATIONS

Extended European Search Report, European Application No. 15174173.3-1610, dated Nov. 17, 2015, 9 pages.

*Primary Examiner* — Woody Lee, Jr.
*Assistant Examiner* — Theodore Ribadeneyra
(74) *Attorney, Agent, or Firm* — Barnes & Thornburg LLP

(57) ABSTRACT

A turbofan gas turbine engine for use in an aircraft includes a fan, an engine core, and a cleaning system. The fan and engine core cooperate to provide thrust for an aircraft when in use but may suffer performance degradation when dirty. The cleaning system is configured to conduct a cleaning agent from a supply into the turbofan gas turbine engine to clean the turbofan gas turbine engine.

11 Claims, 2 Drawing Sheets

(56) References Cited

U.S. PATENT DOCUMENTS

| | | |
|---|---|---|
| 6,659,715 B2 | 12/2003 | Kuesters et al. |
| 7,033,135 B2 * | 4/2006 | Mortzheim ............. F01D 9/065 |
| | | 415/115 |
| 7,033,979 B2 | 4/2006 | Herwig et al. |
| 8,245,952 B2 | 8/2012 | de la Bruère-Terreault et al. |
| 8,303,243 B2 | 11/2012 | Fish et al. |
| 8,337,630 B2 | 12/2012 | de la Bruère-Terreault et al. |
| 8,479,754 B2 | 7/2013 | Hjerpe |
| 8,523,514 B2 | 9/2013 | Eastwood et al. |
| 2008/0173330 A1 * | 7/2008 | Wagner .................... B08B 3/00 |
| | | 134/18 |
| 2009/0084411 A1 * | 4/2009 | Woodcock ............... B08B 9/00 |
| | | 134/22.18 |
| 2010/0212703 A1 | 8/2010 | De la Bruere-Terreault et al. |
| 2011/0005554 A1 | 1/2011 | Du Plessis |
| 2011/0083701 A1 * | 4/2011 | Esmacher ............. F01D 25/002 |
| | | 134/22.11 |
| 2012/0134777 A1 * | 5/2012 | Eleftheriou ............. F01D 25/24 |
| | | 415/115 |
| 2013/0174869 A1 * | 7/2013 | Rosing ................. B08B 7/0021 |
| | | 134/7 |
| 2014/0144151 A1 * | 5/2014 | Bifulco .................... F02C 9/00 |
| | | 60/772 |
| 2015/0122292 A1 | 5/2015 | McDermott |

\* cited by examiner

CLEANING SYSTEM FOR A TURBOFAN GAS TURBINE ENGINE

CROSS REFERENCE TO RELATED APPLICATIONS

This application claims priority to and the benefit of U.S. Provisional Patent Application No. 62/021,939, filed Jul. 8, 2014, the disclosure of which is now expressly incorporated herein by reference.

FIELD OF THE DISCLOSURE

The present disclosure relates generally to gas turbine engines, and more specifically to cleaning systems for gas turbine engines.

BACKGROUND

Turbofan gas turbine engines are used to power aircraft. Turbofan gas turbine engines typically include a fan that accelerates air to provide thrust and an engine core that drives the fan. The engine core typically includes a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where energy is extracted to drive the compressor and the fan. Leftover products of the combustion are exhausted out of the engine core to provide additional thrust.

Dirt and grime is accumulated in turbofan gas turbine engines from atmospheric air ingested and fuel burned during operation. As dirt and grime build up in turbofan engines, the performance of those engines may be reduced due to aerodynamic and frictional losses. To reduce the dirt and grime in a turbofan gas turbine engine, a cleaning agent (usually water) may be sprayed at the fan of the engine while the fan is rotating, which, in turn, moves the water through the rest of the engine including the engine core. However, on account of the shape of the fan, much of the water may move through a bypass duct around the engine core rather than through the engine core. This bypassed cleaning agent does not aid in cleaning the engine core components. Use of this approach for cleaning a turbofan gas turbine engine may result in wasted cleaning agent and longer required cleaning times.

SUMMARY

The present disclosure may comprise one or more of the following features and combinations thereof.

According to an aspect of the present disclosure, a turbofan gas turbine engine may include a fan, an engine core, and an annular frame. The fan may be adapted to be rotated about an axis to accelerate air. The engine core may be coupled to the fan to drive rotation of the fan and may include a compressor, a combustor, and a turbine. The annular frame may include an inner wall that extends around the engine core and an outer wall that extends around the inner wall, the inner wall and the outer wall cooperating to define a bypass duct radially there between in fluid communication with the fan to receive bypass air accelerated by the fan.

In some embodiments, the turbofan gas turbine engine may also include a cleaning system configured to conduct a cleaning agent from a supply radially through the bypass duct to the engine core. The cleaning system may include a supply connector adapted to be fluidly coupled to the supply and receive the cleaning agent, an injector formed to include an aperture arranged to conduct the cleaning agent into the compressor of the engine core, and a conduit that extends from the supply connector through the bypass duct formed by the annular frame. In some embodiments, the cleaning system may also include a valve configured to block or allow the flow of a cleaning agent from the supply connector to the injector.

In some embodiments, the conduit may extend perpendicular to the axis between the outer wall of the annular frame and the inner wall of the annular frame. The cleaning system includes a transfer tube that extends along the axis from the conduit to the injector. The annular frame may include a strut that extends from the outer wall through the bypass duct to the inner wall of the frame and the conduit is arranged in the strut so that the conduit is shielded from air accelerated from the fan passing through the bypass duct.

In some embodiments, the cleaning system may include a conduit that extends radially from the outer wall of the frame through the bypass duct to the inner wall of the frame. The annular frame may include a strut that extends from the outer wall of the frame through the bypass duct to the inner wall of the frame and the conduit may be arranged in the strut so that the conduit is shielded from air accelerated from the fan passing through the bypass duct. The conduit may extend generally perpendicular to the axis between the outer wall of the annular frame and the inner wall of the annular frame.

In some embodiments, the cleaning system may be configured to inject the cleaning agent from the supply into the compressor of the engine core. The turbofan engine may also include an inlet guide vane assembly. The inlet guide vane assembly may include a bypass inlet vane ring arranged between the fan and the bypass duct of the annular frame to redirect air moving from the fan to the bypass duct, a core inlet vane ring arranged between the fan and the compressor of the engine core to redirect air moving from the fan to the compressor, and a splitter coupled radially between the bypass inlet vane ring and the core inlet vane ring.

In some embodiments, the cleaning system may include at least one injector mounted in the core inlet vane ring and formed to include an aperture configured to conduct the cleaning agent from the supply into the compressor. The aperture may be sized to conduct the cleaning agent when the cleaning agent is foamed. Then at least one injector may have an airfoil shape to redirect air moving from the fan to the compressor. The cleaning system may include a conduit that extends radially from the outer wall of the frame through the bypass duct to the inner wall of the frame and a transfer tube that extends axially within the splitter to one of the injectors.

According to another aspect of the present disclosure, a turbofan gas turbine engine may include a fan, an engine core couple to the fan to drive rotation of the fan, and an annular frame including an inner wall that extends around the engine core and an outer wall that extends around the inner wall to form a bypass duct. The engine core may also include a compressor, a combustor, and a turbine.

In some embodiments, the turbofan gas turbine engine may also include a cleaning system including a supply connector adapted to be fluidly coupled to a supply to receive a cleaning agent, an injector formed to include an aperture arranged to conduct the cleaning agent into the engine core, and a conduit that extends from the supply connector through the bypass duct. The injector may be arranged to conduct the cleaning agent into the compressor of the engine core.

In some embodiments, the cleaning system may include a valve configured to block or allow the flow of cleaning agent from the supply connector to the injector. The conduit may extend perpendicular to the axis between the outer wall of the annular frame and the inner wall of the annular frame. The cleaning system may also include a transfer tube that extends along the axis from the conduit to the injector.

In some embodiments, the annular frame may include a strut that extends from the outer wall of the frame through the bypass duct to the inner wall of the frame. The conduit may be arranged in the strut so that the conduit is shielded from air accelerated from the fan passing through the bypass duct.

These and other features of the present disclosure will become more apparent from the following description of the illustrative embodiments.

DETAILED DESCRIPTION OF THE DRAWINGS

Figure 1:
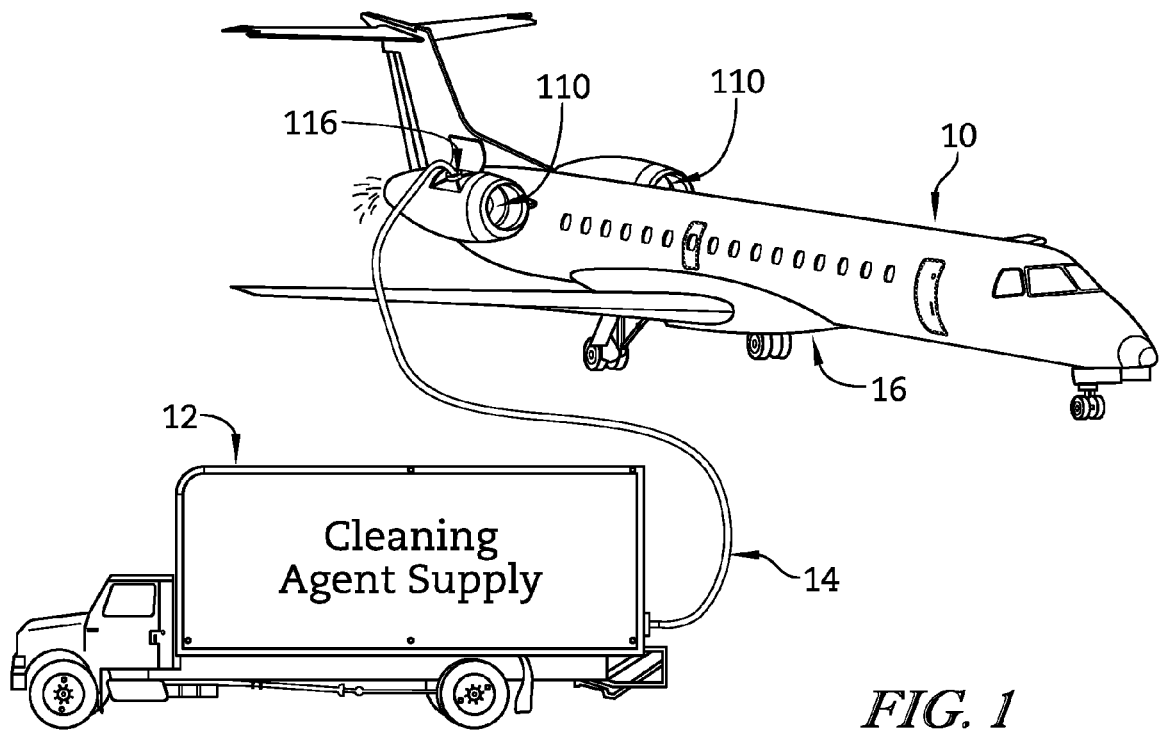
FIG. 1 is a perspective view of an aircraft including turbofan gas turbine engines and a cleaning agent supply vehicle showing the cleaning agent supply vehicle coupled to one of the turbofan gas turbine by a hose so that a cleaning agent can be conducted to the turbofan gas turbine engine.

For the purposes of promoting an understanding of the principles of the disclosure, reference will now be made to a number of illustrative embodiments illustrated in the drawings and specific language will be used to describe the same.

An illustrative aircraft 10 and cleaning agent supply 12 are shown in FIG. 1. A hose 14 extends from the cleaning agent supply 12 to the aircraft 10 and is connected to one of two turbofan gas turbine engines 110 included in the aircraft 10 to provide a cleaning agent to the engine 110. The rotating components of the engine 110 are rotated under external power (dry motored) to cause the cleaning agent to move through the engine 110 and clean the engine 110 as suggested in FIG. 1.

Figure 2:
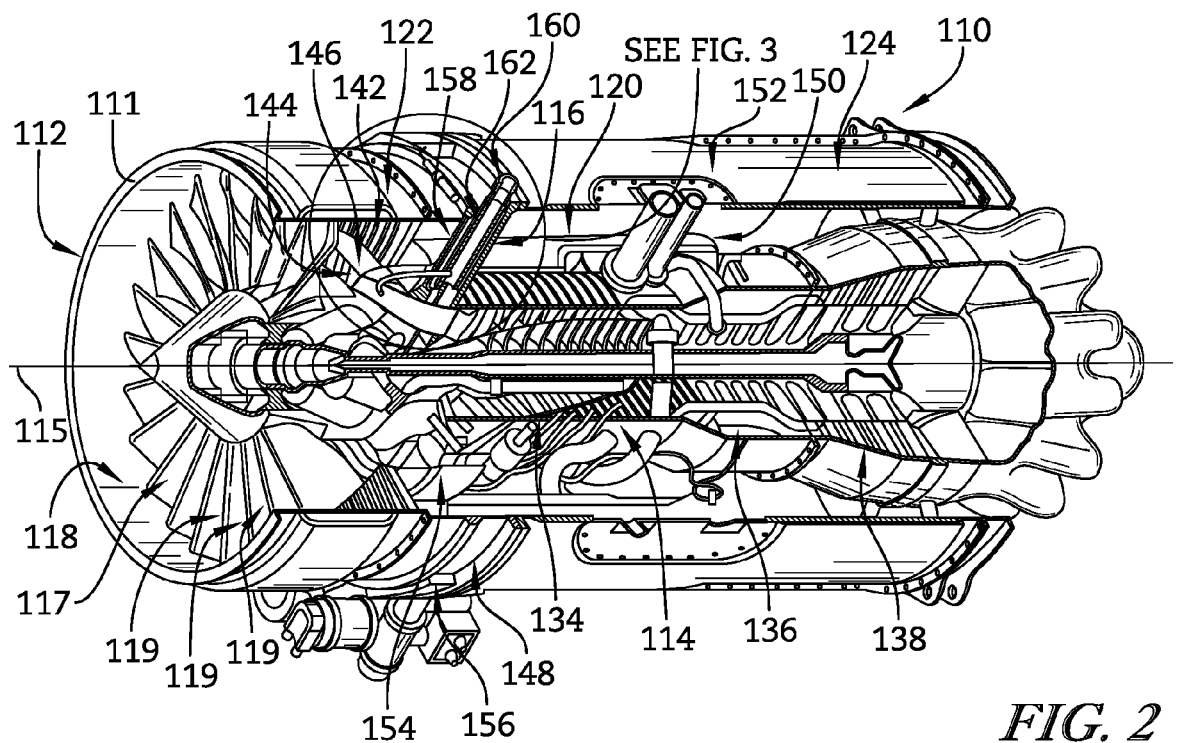
FIG. 2 is a perspective view of one of the turbofan gas turbine engines from FIG. 1 removed from the aircraft and cut away to show a cleaning system included in the engine configured to conduct the cleaning agent from the cleaning agent supply into the engine.

Each engine 110 is coupled to an airframe 16 included in the aircraft 10 and generates thrust to drive the aircraft 10. In the illustrative embodiment, each engine 110 includes a fan 112, an engine core 114, and a cleaning system 116 as shown in FIG. 2. The fan 112 is arranged at the front 111 of the engine and rotates about an axis 115. The engine core 114 is coupled to the fan 112 and provides power to drive the fan 112. The cleaning system 116 conducts cleaning agent from the cleaning agent supply 12 to the engine core 114 without passing through the fan 112 at the front 111 of the engine 110 so that cleaning agent intended to clean the engine core 114 does not move through the engine 110 in a bypass duct 120 without entering the engine core 114.

Figure 3:
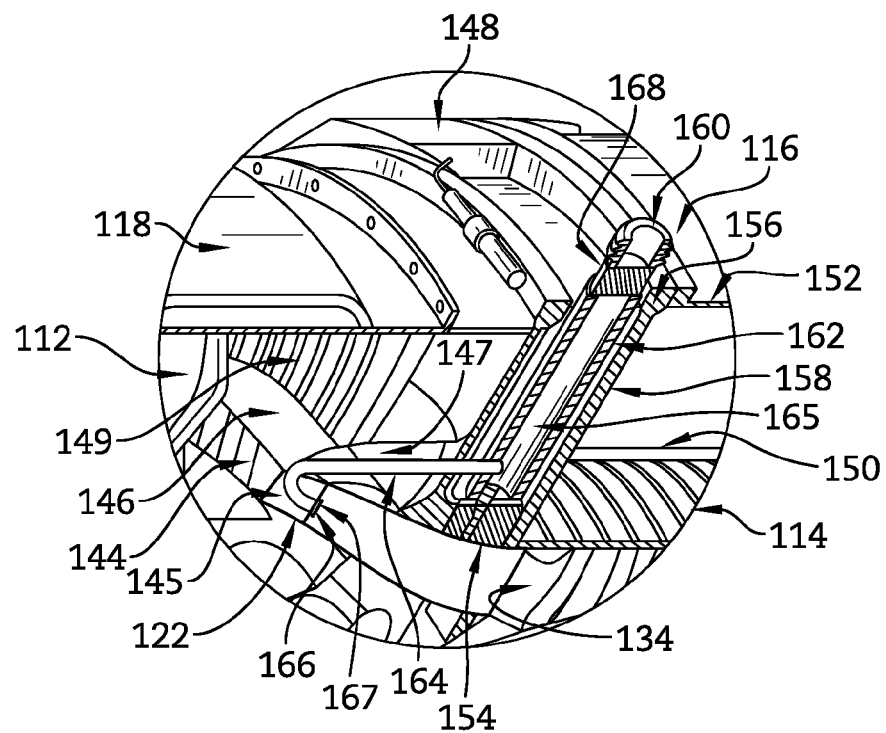
FIG. 3 is a detail view of a portion of the turbofan gas turbine engine shown in FIG. 2 showing that the cleaning system includes a supply connector, an injector arranged to conduct the cleaning agent into an engine core, a conduit that extends from the supply connector through the bypass duct, and a valve configured to block or allow the flow of cleaning agent from the supply connector to the injector.
Figure 4:
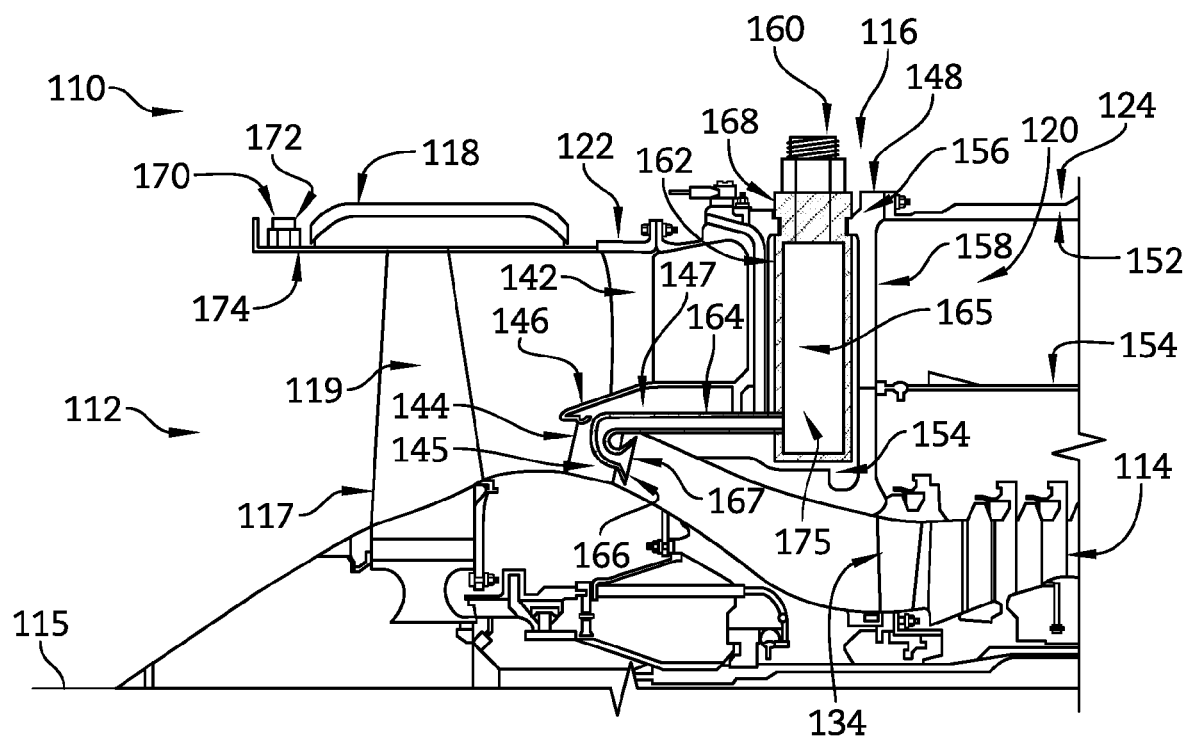
FIG. 4 is a cross-sectional view of a portion of the turbofan gas turbine engine shown in FIGS. 2 and 3 showing that the conduit included in the cleaning system extends from the supply connector through a bypass duct and is shielded by a strut.

The fan 112 illustratively includes a fan rotor 117 and a fan case 118 as shown in FIGS. 2-4. The fan rotor 117 has a plurality of blades 119 that rotates about the axis 115 to accelerate air generating thrust for the aircraft 10. The fan case 118 extends around the fan blades 119 to direct air from the fan rotor 117 through the engine core and the bypass duct 120.

The engine core 114 illustratively includes a compressor 134, a combustor 136, and a turbine 138 as shown in FIG. 2. The compressor 134 compresses and delivers air to the combustor 136. The combustor 136 mixes fuel with the compressed air received from the compressor 134 and ignites the fuel. The high pressure hot products of the combustion reaction in the combustor 136 are directed into the turbine 138 to cause the turbine 138 to drive the compressor 134 and the fan 112.

The illustrative cleaning system 116 is configured to provide cleaning solution to the compressor 134 of the engine core 114 as suggested in FIG. 2. By delivering the cleaning solution to the compressor 134, cleaning solution is passed through the combustor 136 and the turbine 138 of the engine core 114 so that internal components of the engine core 114 are cleaned.

In addition to the fan 112, engine core 114, and the cleaning system 116, each engine 110 also includes an inlet guide vane assembly 122 and a bypass assembly 124 as shown in FIG. 2. The inlet guide vane assembly 122 redirects accelerated air leaving the fan 112 and entering the engine core 114 or the bypass duct 120. The bypass assembly 124 defines the bypass duct 120 that conveys accelerated air from the fan 112 through the engine 110 without entering the engine core 114.

The inlet guide vane assembly 122 is annular and illustratively includes a bypass inlet vane ring 142, a core inlet vane ring 144, and a splitter 146 as shown in FIG. 4. The bypass inlet vane ring 142 is arranged between the fan 112 and the bypass duct 120 to redirect air moving from the fan 112 to the bypass duct 120. The core inlet vane ring 144 is arranged between the fan 112 and the compressor 134 of the engine core 114 to redirect air moving from the fan 112 to the compressor 134. The splitter 146 illustratively has a V-shaped cross section that forms an annular cavity 147 and is coupled radially between the bypass inlet vane ring 142 and the core inlet vane ring 144.

The bypass assembly 124 defines the bypass duct 120 and illustratively includes an annular frame 148, a core shield 150, and a nacelle shield 152 as shown in FIGS. 2 and 4. The frame 148 (sometimes called the front frame) is illustratively a structural component that is coupled to the airframe 16 included in the aircraft 10 of FIG. 1 and supports the fan 112, the engine core 114, the cleaning system 116, and the inlet guide vane assembly 122. The core shield 150 extends axially from the frame 148 away from the fan 112 and radially around a portion of the engine core 114 to block air moving through the bypass duct 120 from interacting with external surfaces of the engine core 114. The nacelle shield 152 also extends axially from the frame 148 away from the fan 112 and radially around the core shield 150 to block air moving through the bypass duct 120 from interacting with internal surfaces of a nacelle 18 included in the airframe 16 of the aircraft 10. The core shield 150 and the nacelle shield 152 cooperate to define a portion of the bypass duct 120 radially there between as shown in FIGS. 2-4.

The annular frame 148 is illustratively a cast component and includes an inner wall 154, an outer wall 156, and a plurality of struts 158 as shown in FIGS. 3 and 4. The inner wall 154 extends around a portion of the engine core 114. The outer wall 156 is spaced radially from the inner wall 154 and extends around the inner wall 154. The inner wall 154 and the outer wall 156 cooperate to define a portion of the bypass duct 120 radially there between as shown in FIGS. 2-4. The struts 158 extend radially from the outer wall 156 through the bypass duct 120 at various circumferential locations around the engine 110 to the inner wall 154 and are hollow to allow for the passage of various lines and tubes into and out of the engine core 114.

In the illustrative embodiment, the cleaning system 116 is integrated with the bypass assembly 124 and the inlet guide vane assembly 122 as shown in FIG. 3. The cleaning system 116 illustratively includes a supply connector 160, a conduit 162, a transfer tube 164, an injector 166, and a valve 168 as shown in FIGS. 3 and 4. The supply connector 160 is illustratively a threaded connector adapted to be fluidly coupled to the cleaning agent supply 12 to receive cleaning agent. The conduit 162 extends radially from the supply connector 160 through the bypass duct 120 and is formed to include a passageway 165 sized to conduct a predetermined flow of cleaning agent. The transfer tube 164 extends axially from the conduit 162 to the injector 166. The injector 166 is formed to include an aperture 167 arranged to conduct cleaning agent into the compressor 134 included in the engine core 114. The valve 168 is configured to block or allow the flow of cleaning agent from the supply connector 160 to the injector 166.

The conduit 162 illustratively extends perpendicular to the axis 115 in the radial direction from the outer wall 156 of the frame 148 through the bypass duct 120 to the inner wall 154 of the frame 148 as shown in FIG. 4. The conduit 162 is arranged in a strut 158 so that the conduit 162 is shielded from air accelerated from the fan 112 passing through the bypass duct 120. In the illustrative embodiment, the passageway 165 formed in the conduit 162 is sized to conduct a foamed cleaning agent.

The transfer tube 164 illustratively extends along the axis 115 from the conduit 162 to the injector 166 as shown in FIG. 4. In the illustrative embodiment, the transfer tube 164 extend axially within the splitter 146 of the inlet guide vane assembly 122 to an injector 166 mounted in the core inlet vane ring 144. In some embodiments, the conduit 162 feeds into a circumferentially extending plenum 175 and a plurality of transfer tubes 164 are plumbed to the plenum 175 at various locations around the circumference of the engine 110. In embodiments with a plurality of transfer tubes 164, each transfer tube 164 may extend to a corresponding injector 166 mounted in the core inlet vane ring 144.

The injector 166 is illustratively mounted in the core inlet vane ring 144 and is formed to include the aperture 167 sized to conduct foamed cleaning agent into the compressor 134 as shown in FIGS. 3 and 4. In the illustrative embodiment, the injector 166 has an airfoil shape substantially similar to that of other vanes 145 included in the core inlet vane ring 144 to redirect air moving from the fan 112 to the compressor 134 but may have other shapes. In other embodiments, the injector may be mounted at any location aft of the fan 112 and arranged to conduct cleaning agent into the compressor 134.

The valve 168 is illustratively a ball valve controlled by a knob (not shown) that closes and opens to block or allow the flow of cleaning agent from the supply connector 160 to the injector 166 as suggested in FIG. 4. In other embodiments, the valve 168 may be another type of manually or automatically actuated valve, may be a one-way check valve that only allows flow agent from the supply connector 160 toward the injector 166, or may be any other suitable type of valve.

The illustrative supply connector 160, conduit 162, transfer tube 164, injector 166, and valve 168 are sized and configured for use with a foamed cleaning agent. Particularly, the illustrative components 160, 162, 164, 166, 168 are adapted for use with the foamed cleaning agents available from Matrix Scientific and Aerocore Technologies, both of Columbia, S.C., U.S.A. In other embodiments, the supply connector 160, conduit 162, transfer tube 164, injector 166, and valve 168 may be sized and configured for use with other cleaning agents including deionized water or other suitable agents.

The cleaning system 116 in the illustrative embodiment further includes an optional fan cleaning assembly 170 integrated into the engine 110 as shown in FIG. 4. The fan cleaning assembly 170 includes a secondary connector 172 mounted to the fan case 118 and a secondary injector 174. The secondary connector 172 is illustratively a threaded connector adapted to be coupled to the cleaning agent supply 12. The secondary injector 174 is in fluid communication with the secondary connector 172 and is formed to include an aperture 175 arranged to dispense cleaning agent onto the blades 19 of the fan rotor 17. In the illustrative embodiment, the secondary connector 172 and the secondary injector 174 are sized to conduct foamed cleaning agent but may be adapted for use with water or other cleaning agents.

In other embodiments, the cleaning system 116 may be integrated into other types of gas turbine engines. For example, the cleaning system 116 may be integrated into land based energy turbines, aerospace engines, marine turbines, and the like.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbofan gas turbine engine comprising
a fan adapted to be rotated about an axis to accelerate air,
an engine core coupled to the fan to drive rotation of the fan, the engine core including a compressor, a combustor, and a turbine,
an annular frame including an inner wall that extends around the engine core and an outer wall that extends around the inner wall, the inner wall and the outer wall cooperating to define a bypass duct radially there between in fluid communication with the fan to receive bypass air accelerated by the fan,
a cleaning system configured to conduct a cleaning agent from a supply radially through the bypass duct to the engine core and to inject the cleaning agent from the supply into the compressor of the engine core, and
an inlet guide vane assembly including a bypass inlet vane ring arranged between the fan and the bypass duct of the annular frame to redirect air moving from the fan to the bypass duct, a core inlet vane ring arranged between the fan and the compressor of the engine core to redirect air moving from the fan to the compressor, and a splitter coupled radially between the bypass inlet vane ring and the core inlet vane ring, wherein the cleaning system includes at least one injector mounted in the core inlet vane ring and formed to include an aperture configured to conduct the cleaning agent from the supply into the compressor, and wherein the cleaning system includes a conduit located axially aft of the bypass inlet vane ring that extends radially from the outer wall of the frame through the bypass duct to the inner wall of the frame and a transfer tube that extends axially within the splitter to one of the injectors.

2. The turbofan gas turbine engine of claim 1, wherein the cleaning system includes a supply connector adapted to be fluidly coupled to the supply and receive the cleaning agent.

3. The turbofan gas turbine engine of claim 2, wherein the cleaning system includes a valve configured to block or allow the flow of cleaning agent from the supply connector to the injector.

4. The turbofan gas turbine engine of claim 2, wherein the conduit extends perpendicular to the axis between the outer wall of the annular frame and the inner wall of the annular frame and the transfer tube extends along the axis from the conduit to the injector.

5. The turbofan gas turbine engine of claim 4, wherein the annular frame includes a strut that extends from the outer wall through the bypass duct to the inner wall of the frame and the conduit is arranged in the strut so that the conduit is shielded from air accelerated from the fan passing through the bypass duct.

6. The turbofan gas turbine engine of claim 1, wherein the at least one injector has an airfoil shape to redirect air moving from the fan to the compressor.

7. A turbofan gas turbine engine comprising
a fan,
an engine core couple to the fan to drive rotation of the fan, the engine core including a compressor, a combustor, and a turbine,
an annular frame including an inner wall that extends around the engine core and an outer wall that extends around the inner wall to form a bypass duct,
an inlet guide vane assembly including a bypass inlet vane ring arranged between the fan and the bypass duct of the annular frame to redirect air moving from the fan to the bypass duct, a core inlet vane ring arranged between the fan and the compressor of the engine core to redirect air moving from the fan to the compressor, and a splitter coupled radially between the bypass inlet vane ring and the core inlet vane ring, and
a cleaning system including a supply connector adapted to be fluidly coupled to a supply to receive a cleaning agent, an injector formed to include an aperture arranged to conduct the cleaning agent into the engine core, a conduit located axially aft of the bypass inlet vane ring that extends from the supply connector through the bypass duct, and a transfer tube that extends axially within the splitter of the inlet guide vane assembly between the conduit and the injector.

8. The turbofan gas turbine engine of claim 7, wherein the injector is arranged to conduct the cleaning agent into the compressor of the engine core.

9. The turbofan gas turbine engine of claim 7, wherein the cleaning system includes a valve configured to block or allow the flow of cleaning agent from the supply connector to the injector.

10. The turbofan gas turbine engine of claim 9, wherein the conduit extends perpendicular to the axis between the outer wall of the annular frame and the inner wall of the annular frame and the transfer tube extends parallel to the axis between the conduit and the injector.

11. The turbofan gas turbine engine of claim 7, wherein the annular frame includes a strut that extends from the outer wall of the frame through the bypass duct to the inner wall of the frame and the conduit is arranged in the strut so that the conduit is shielded from air accelerated from the fan passing through the bypass duct.

* * * * *